United States Patent [19]
Calabrese, Jr.

[11] Patent Number: 5,860,393
[45] Date of Patent: *Jan. 19, 1999

[54] AQUARIUM WATER FLOW CONTROL DEVICE

[76] Inventor: Cosmo Damiano Calabrese, Jr., 13837 W. Sandstone Dr., Lockport, Ill. 60441

[ * ] Notice: This patent issued on a continued prosecution application filed under 37 CFR 1.53(d), and is subject to the twenty year patent term provisions of 35 U.S.C. 154(a)(2).

[21] Appl. No.: 772,832

[22] Filed: Dec. 24, 1996

[51] Int. Cl.[6] .................................................. A01K 63/04
[52] U.S. Cl. ...................... 119/260; 210/169; 210/416.2
[58] Field of Search ................................... 119/259, 260, 119/261, 263, 264; 210/169, 221.1, 416.2, 151

[56] References Cited

U.S. PATENT DOCUMENTS

| | | | |
|---|---|---|---|
| 4,687,575 | 8/1987 | Grose | 119/260 |
| 5,006,230 | 4/1991 | Votava, III et al. | 119/260 |
| 5,266,190 | 11/1993 | Tominaga . | |
| 5,290,436 | 3/1994 | Danner . | |
| 5,316,670 | 5/1994 | Yao . | |
| 5,413,707 | 5/1995 | Shatilov . | |
| 5,453,182 | 9/1995 | Kikuta . | |

Primary Examiner—Ren Yan
Attorney, Agent, or Firm—James R. Foley, Esq.

[57] ABSTRACT

An aquarium water flow control device for receiving a flow of aquarium water from an aquarium and for controlling a flow of aquarium water thereafter from said aquarium water flow control device is provided. The device comprises an outlet capable of allowing the aquarium water to flow therethrough and a tube having an end positioned proximate to the outlet. The tube extends in a substantially upward direction and is capable of supplying air to the outlet when the outlet is covered with aquarium water and while the aquarium water is flowing through the outlet. The outlet is connectable to a hose leading to an aquarium water filtering device which is capable of extracting the aquarium water and air from the tube through the outlet. The aquarium water flow control device also includes a wall which divides the aquarium water flow control device into a first section and a second section. Flow of aquarium water from the aquarium is flowable into the first section, over the wall, and to the second section where the outlet is located. Preferably, the aquarium water flow control device is rectangular in configuration, and preferably the aquarium water flows into the first section from a box insertable inside the aquarium where the box includes one or more longitudinal slits through which the aquarium water flows.

20 Claims, 8 Drawing Sheets

AQUARIUM WATER FLOW CONTROL DEVICE

BACKGROUND OF THE INVENTION

The present invention relates generally to aquarium water flow control devices, and more specifically to an aquarium water flow control device which includes means for supplying a gas, such as air, to an outlet of the device when aquarium water covers and flows through the outlet.

In order to keep the water in a typical aquarium free from dirt, bacteria, algae, etc., it is necessary to either constantly change the water in the aquarium or to at least continuously filter the water. This is because life forms such as fish and plants which inhabit an aquarium excrete pollutants which can not only cause the aquarium to have an undesirable appearance, but can threaten the lives of the inhabitants. For example, if fish are kept in the aquarium, it is necessary to either constantly change the aquarium water or continuously filter the existing aquarium water so that the fish will not die in feces-ridden water. Constantly changing the aquarium water is normally extremely inconvenient and undesirable because of the following: aquariums are often large; inhabitants of the aquarium must be separated from the aquarium water before the water is to be disposed; and, inhabitants of an aquarium always live longer when not forced to re-acclimate to different aquarium water on a constant basis. As a result, aquarium water is usually continuously filtered rather than constantly changed.

In the case of larger aquariums, and in the case of salt-water aquariums in general, typically a filter is located below the aquarium in a cabinet and a pre-filter hangs on a wall of the aquarium. The aquarium water continuously flows from the aquarium, into the pre-filter, down to the filter, and back up into the aquarium. In this manner, the aquarium water is continuously filtered, and therefore kept free of dirt, bacteria, algae, feces, etc. Consequently, the aquarium has a desirable appearance and the life spans of the inhabitants of the aquarium are maximized.

The typical pre-filter will now be described. Normally, a pre-filter includes a means to keep fish from flowing from the aquarium and into the pre-filter. For example, the pre-filter may include a small box located inside the aquarium. The small box generally has an open top, and the small box is usually connected to a larger box that hangs outside the aquarium, on a wall of the aquarium. The top of the small box is located just at the surface of the aquarium water, and therefore, the aquarium water barely flows over the top of the small box and therein. To prevent fish from flowing with the aquarium water into this small box, the top of this box normally has, for example, upwardly extending flanges (or "teeth") with spaces therebetween. Consequently, while the aquarium water can flow between the spaces into this box, the fish cannot flow along with the water into the box because the spaces between the teeth are too small. Unfortunately, these teeth not only keep fish from flowing into the box, but also somewhat diminish the flow of aquarium water therein.

A siphon tube typically carries the water from the small box, over the aquarium wall, and into the larger box hanging outside the aquarium. The larger box includes an outlet and connected to the outlet is the first end of a hose. The other end of the hose is connected to the filter which is located below the aquarium in a cabinet. After the aquarium water flows into the larger box from the small box, the aquarium water thereafter flows through the outlet of the larger box, along the hose, and to the filter. After the water runs through the filter, the water flows along a second hose, and back into the aquarium. In this manner, the aquarium water is continuously brought from the aquarium, filtered, and carried back into the aquarium.

However, the rate of flow of aquarium water from the aquarium into the larger box is normally not equal to the rate of flow of aquarium water through the outlet of the larger box. As a result, the water level above the outlet and inside the larger box constantly fluctuates. Actually, the water level above the outlet typically cycles back and forth between a maximum water level and a water level of effectively zero, at which time mostly air flows through the outlet. When the water level above the outlet is decreasing and reaches a certain height of only a couple inches above the outlet, the sound of the water flowing through the outlet becomes noisy as the water whirlpools out through the outlet. As the water level above the outlet further decreases, the noise of the water flowing through the outlet increases. Finally, as the water level approaches effectively zero such that mostly air flows through the outlet, the sound of the air and water flowing through the outlet becomes extremely noisy. Subsequently, the water level above the outlet rises back to the maximum level, and this noisy cycle is repeated over and over. Unfortunately, some people find this cycle of noise to be annoying. As a result, this cyclical noise is an undesirable characteristic of prior art pre-filters.

Additionally, the larger box of the pre-filter which hangs on the wall of the aquarium is square shaped. Because the larger box hangs on the wall of the aquarium, the aquarium itself must sit enough away from a wall of the room in which it sits such that there is enough room between the wall of the room and the wall of the aquarium for the larger box to hang. Because the larger box is square, the space required to be left between the wall of the room and the wall of the aquarium is not minimized. Therefore, the aquarium takes up more space in the room in which it is located. Additionally, small children may crawl or walk behind the aquarium, and this can prove dangerous.

The difficulties discussed hereinabove are substantially eliminated by the present invention.

SUMMARY OF THE INVENTION

Accordingly, it is an object of the present invention to provide an aquarium water flow control device which operates quietly.

Another object of the present invention is to provide an aquarium water flow control device which permits the flow of aquarium therefrom without there resulting cyclical noise associated therewith.

Still another object of the present invention is to provide an aquarium water flow control device which includes means for supplying a gas to the outlet as aquarium water flows therethrough.

Yet another object of the present invention is to provide an aquarium water flow control device which includes means for keeping a water level proximate to an outlet substantially constant.

Yet still another object of the present invention is to provide an aquarium water flow control device including means for preventing fish from flowing into the aquarium water flow control device, but where the means for preventing fish from flowing into the aquarium water flow control device does not diminish the flow of aquarium water into the aquarium water flow control device.

Yet a further object of the present invention is to provide an aquarium water flow control device which permits an aquarium to be situated extremely close to a wall of a room in which the aquarium is situated.

By the present invention, it is proposed to overcome the difficulties encountered heretofore. To this end, an aquarium water flow control device is provided for receiving a flow of aquarium water from an aquarium and for controlling a flow of aquarium water thereafter from the aquarium water flow control device. The aquarium water flow control device comprises an outlet capable of allowing the aquarium water to flow therethrough, and means for supplying a gas to the outlet when the outlet is covered with the aquarium water and while the aquarium water is flowing through the outlet.

In another embodiment of the present invention, an aquarium water flow control device is provided, and the aquarium water flow control device comprises an outlet capable of allowing the aquarium water to flow therethrough, and means for keeping a water level proximate to the outlet substantially constant while the aquarium water is flowing through the outlet.

In a preferred embodiment of the present invention, an aquarium water flow control device is provided, and the aquarium water flow control device comprises an outlet capable of allowing the aquarium water to flow therethrough, and a tube having an end positioned proximate to the outlet. The tube extends in a substantially upward direction and is capable of supplying air to the outlet when the outlet is covered with aquarium water and while the aquarium water is flowing through the outlet. The outlet is connectable to a hose leading to an aquarium water filtering device capable of extracting the aquarium water and air from the tube through the outlet. The aquarium water flow control device also includes a wall which divides the aquarium water flow control device into a first section and a second section. The flow of aquarium water from the aquarium is flowable into the first section, over the wall, and to the second section. The outlet is located in the second section. Preferably, the aquarium water flow control device is rectangular in configuration, and the aquarium water flows into the first section from a box insertable inside the aquarium where the box includes one or more longitudinal slits through which the aquarium water flows.

Other features and advantages of the present invention will become apparent from a review of the following description, drawing, and claims.

DETAILED DESCRIPTION OF THE INVENTION

Figure 4:
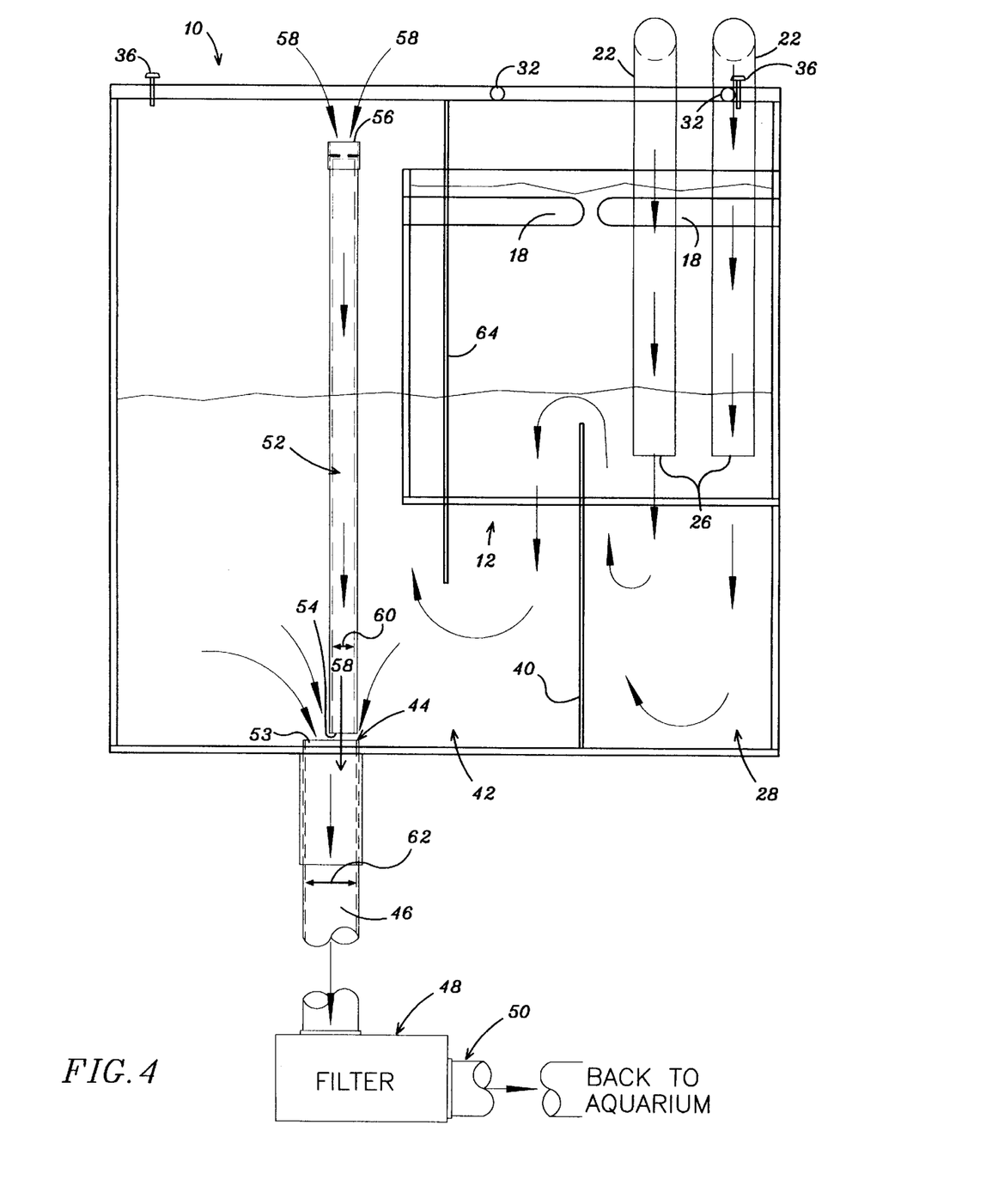
FIG. 4 is a front view of the aquarium water flow control device of FIGS. 1a, 1b, 2a and 2b showing the aquarium water flowing over a wall inside the aquarium water flow control device, and showing both aquarium water and air flowing from the aquarium water flow control device through the outlet and to a filter.
Figure 5:
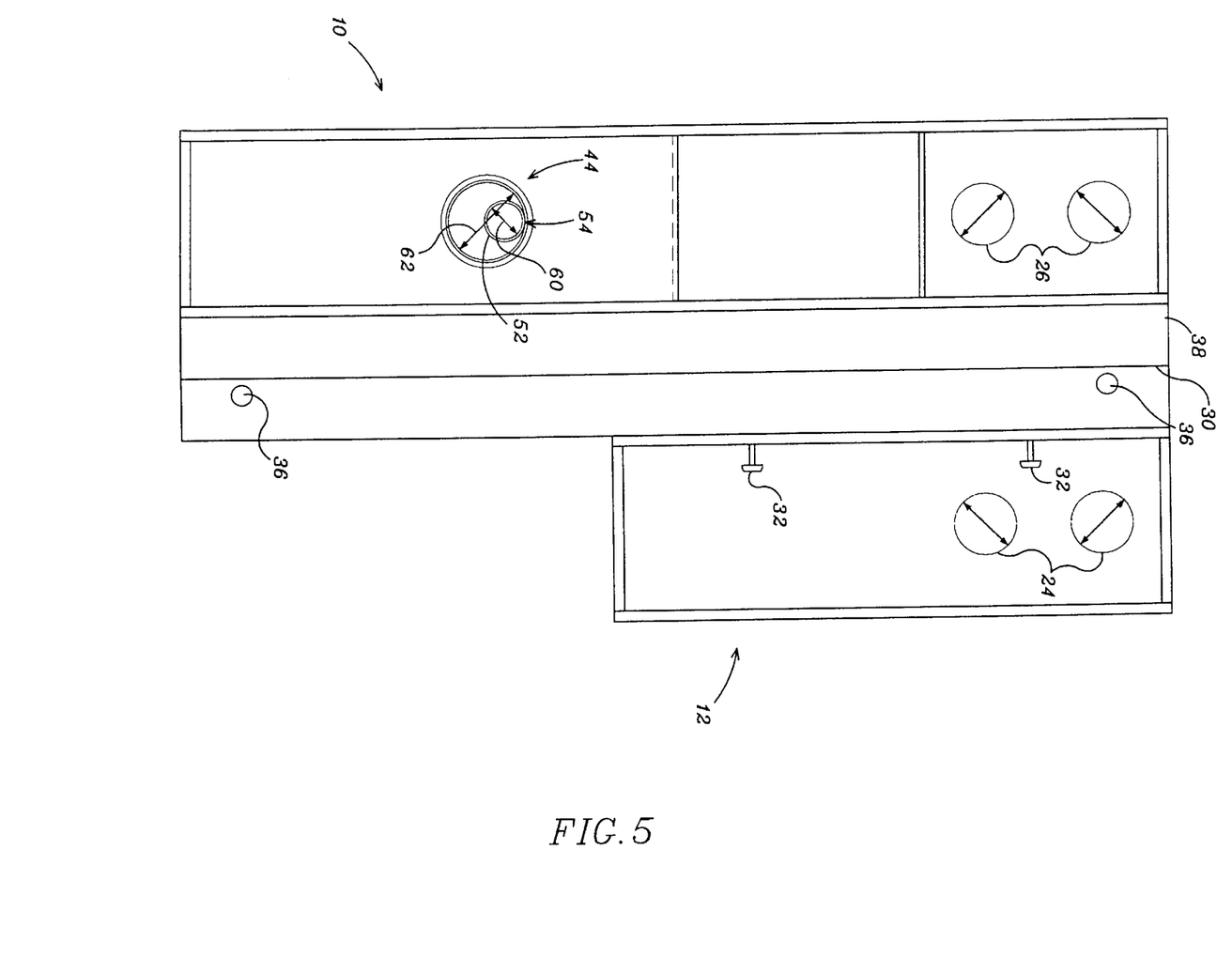
FIG. 5 is a bottom view of the aquarium water flow control device of FIGS. 1a, 1b, 2a and 2b showing an end of the tube which is inside the aquarium water flow control device.
Figure 6:
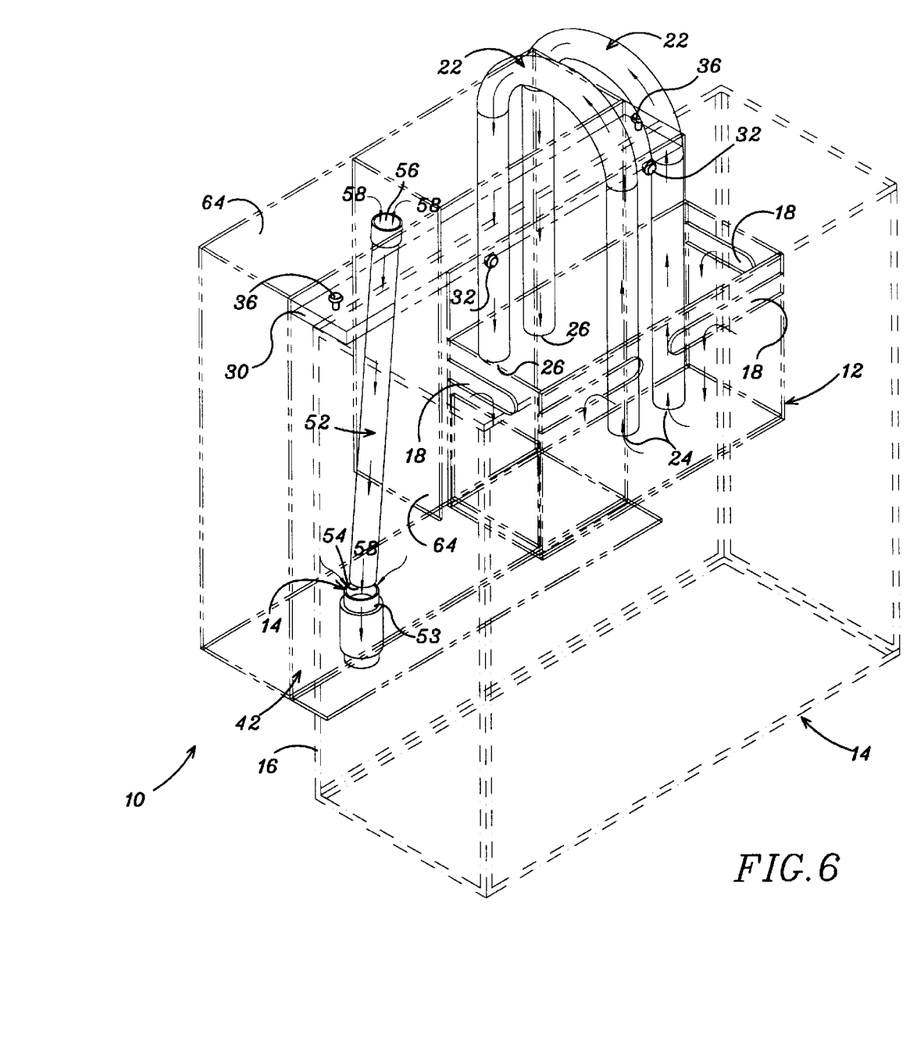
FIG. 6 is a front perspective view of the aquarium water flow control device of FIGS. 1a, 1b, 2a and 2b showing the aquarium water flow control device hanging on an aquarium wall, and showing the general flow of aquarium water through the aquarium water flow control device.

Shown in the Figures is an aquarium water flow control device 10 in accordance with the present invention. The aquarium water flow control device 10 can include a box 12 wherein the box 12 is insertable inside an aquarium 14 as shown in FIGS. 4 and 6 (it should be noted that the aquarium 14 is not shown to scale in the Figures). As shown, the aquarium water flow control device 10 is hangable on a wall 16 of the aquarium 14. The box 12 can include one or more longitudinal slits 18 so that aquarium water 20 can flow from the aquarium 14, through the longitudinal slits 18, and into the box 12. One skilled in the art should recognize that other shapes and designs of the box 12 other than that which is described and depicted herein can be successfully utilized. For example, some opening(s) in the box 12 other than longitudinal slits 18 can be used. However, it should be pointed out that the longitudinal slits 18 provide the advantage of preventing aquarium life forms such as fish (not shown) from flowing into the box 12 notwithstanding the fact that the level of the aquarium water 20 in the aquarium 14 may exceed the height of the longitudinal slits 18. Additionally, the longitudinal slits 18 do not diminish the rate of flow of aquarium water 20 into the box 12. This is in contrast to prior art boxes which typically include upwardly extending flanges (or "teeth") with spaces therebetween where the teeth not only keep fish and other life forms from flowing into the box, but also somewhat diminish the flow of aquarium water therein. Additionally, in prior art designs, if the aquarium water level sufficiently exceeds the height of the teeth, the aquarium life forms can flow over the teeth along with the aquarium water.

The aquarium water flow control device 10 according to the present invention includes one or more siphon tubes 22 with a first end 24 of each siphon tube 22 positioned in the box 12 and a second end 26 of each siphon tube 22 positioned in a first section 28 of the aquarium water flow control device 10. The siphon tubes 22 are capable of carrying aquarium water 20 from the box 12, over the wall 16 of the aquarium 14, and to the first section 28 of the aquarium water flow control device 10. One skilled in the art should recognize that there are other ways of providing that the aquarium water 20 is carried over the wall 16 of the aquarium 14 than by providing siphon tubes 22.

The box 12 is connected to a top supporting panel 30 by way of pins 32 which are insertable in slots 34 on the box 12. As shown best in FIG. 3, on the top supporting panel 30 are screws 36 which are connectable with the wall 16 of the aquarium 14 so that the screws 36 can be adjusted to change the height of the aquarium water flow control device 10 in relation to the wall 16 of the aquarium 14. Additionally, the aquarium water flow control device 10 includes a bottom supporting panel 38 which rests against the wall 16 of the aquarium 14 when the aquarium water flow control device 10 hangs on the wall 16.

Figure 1A:
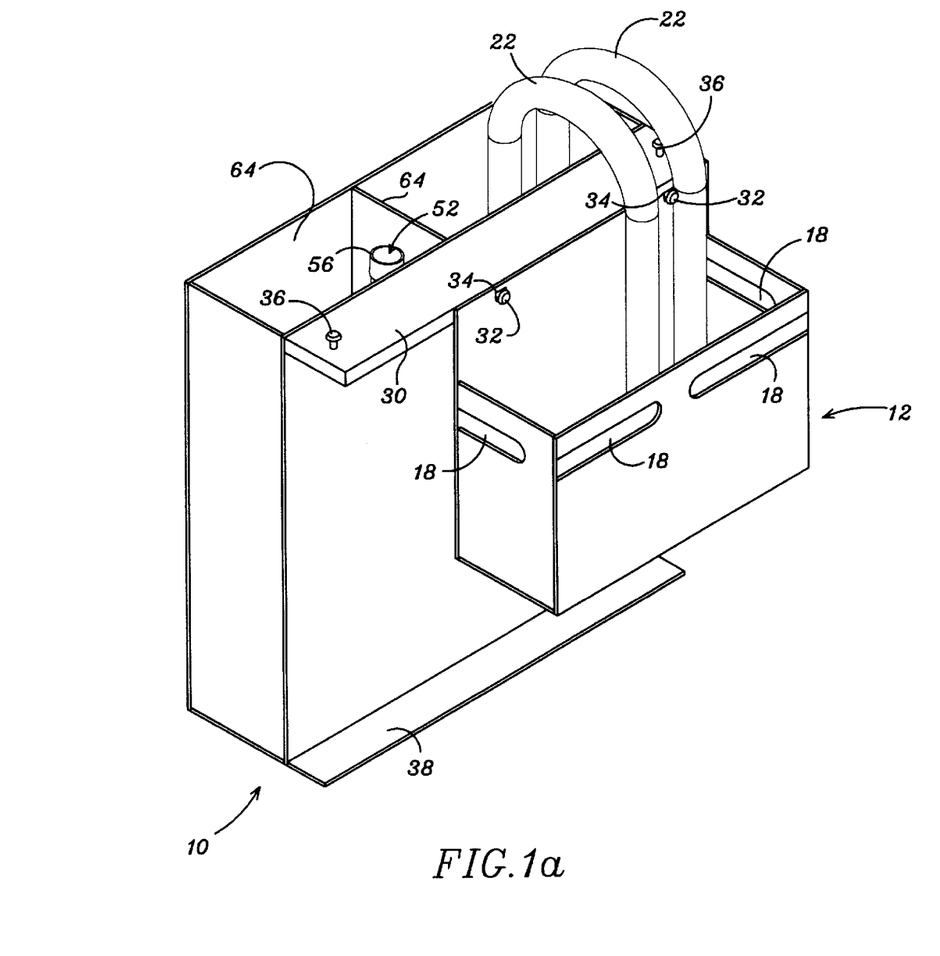
FIG. 1a is a front perspective view of an aquarium water flow control device in accordance with the present invention.
Figure 1B:
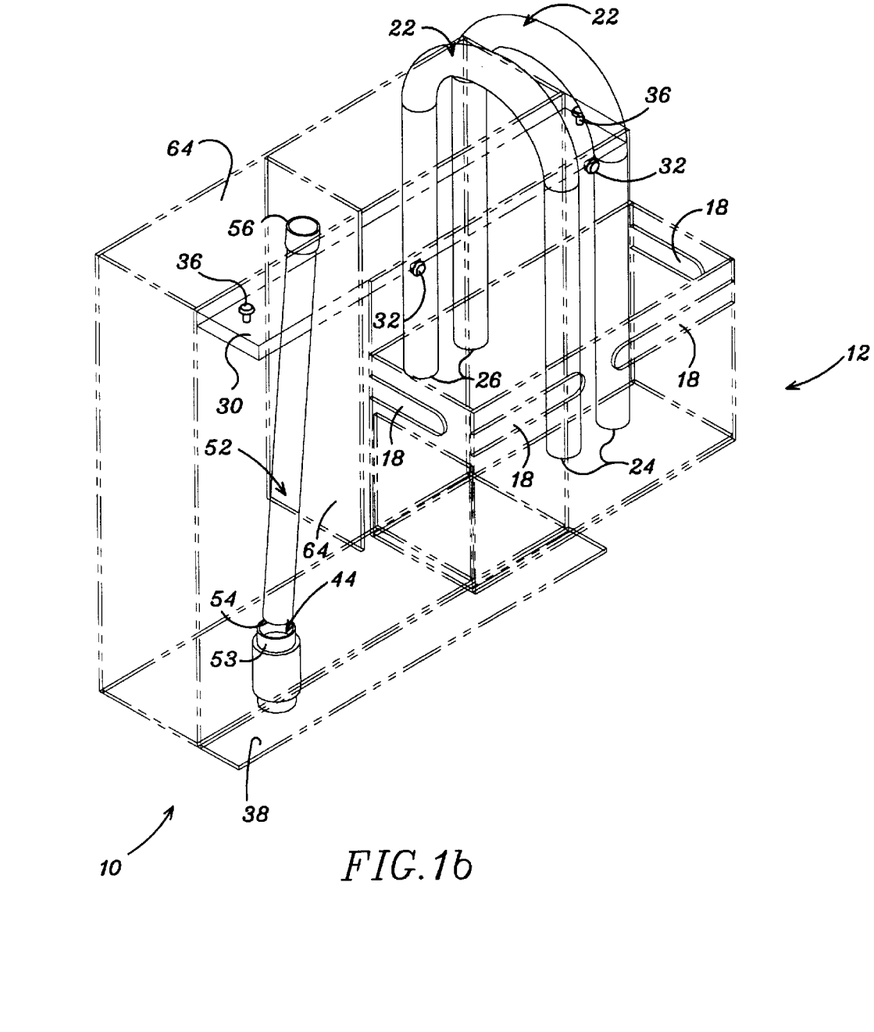
FIG. 1b is a front perspective view of the aquarium water flow control device of FIG. 1a showing a tube and an outlet inside the aquarium water flow control device.
Figure 2A:
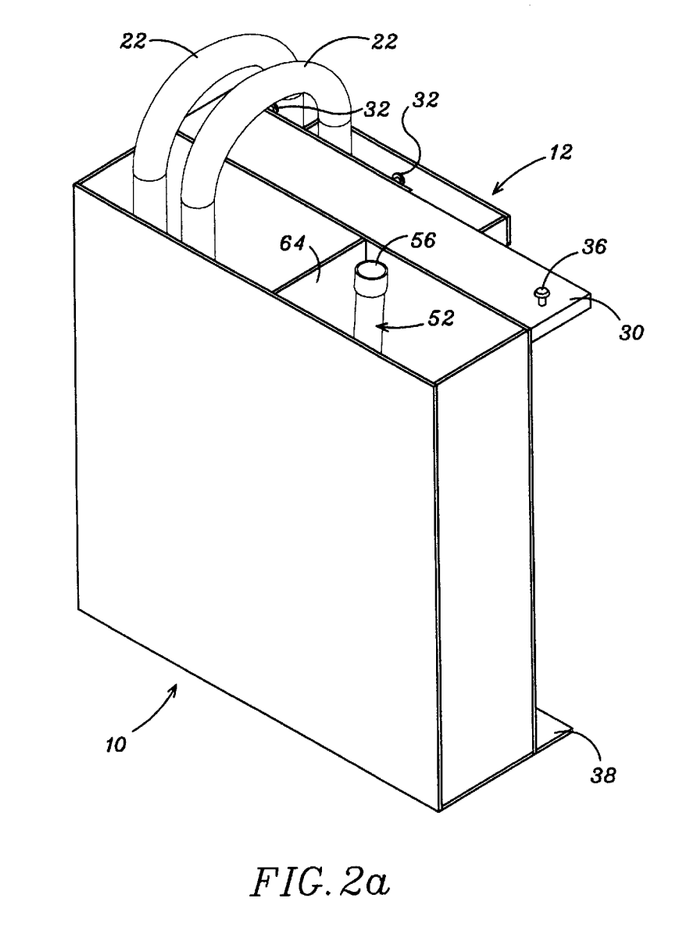
FIG. 2a is a rear perspective view of the aquarium water flow control device of FIGS. 1a and 1b.
Figure 2B:
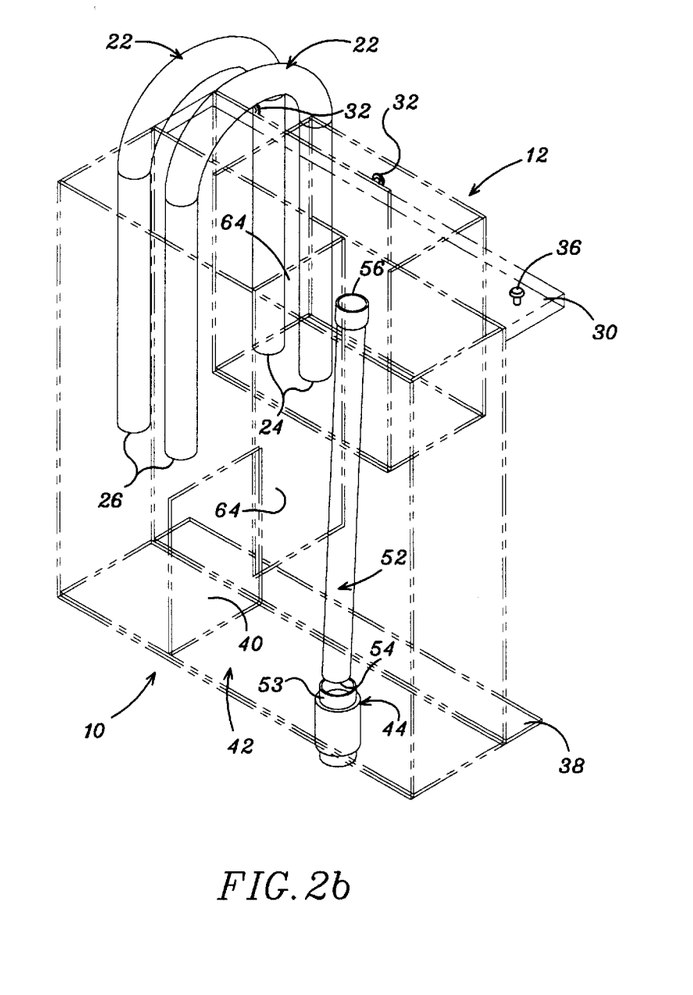
FIG. 2b is a rear perspective view of the aquarium water flow control device of FIGS. 1a, 1b and 2a showing the tube, the outlet, and a wall inside the aquarium water flow control device.

As shown in FIGS. 1b, 2b and 4, inside the aquarium water flow control device 10 is a wall 40 which divides the aquarium water flow control device 10 into a first section 28 and a second section 42. When the aquarium water 20 flows out of the siphon tubes 22, the aquarium water 20 flows into the first section 28 of the aquarium water flow control device 10. As shown best in FIG. 4, aquarium water 20 can then flow from the first section 28, over the wall 40, to the second section 42 of the aquarium water flow control device 10. A filtering sponge (not shown) may be positioned proximate to the wall 40 so that large particles (not shown) within the aquarium water 20 can be prevented from traveling over the wall 40 to the second section 42 of the aquarium water flow control device 10.

An outlet 44 is in the second section 42 of the aquarium water flow control device 10. After the aquarium water 20 has traveled over the wall 40 into the second section 42, the aquarium water 20 can flow through the outlet 44. As shown in FIG. 4, the outlet 44 is connectable to a hose 46 which leads to a filter 48. Preferably, the filter 48 is a wet/dry filter, and is capable of removing contaminants from the aquarium water 20 and returning the aquarium water 20 to the aquarium 14 through a return hose 50. Typically, the filter 48 will be located inside a cabinet (not shown) on which the aquarium 14 rests. A filtering sponge (not shown) may be positioned by the outlet 44 so that large particles (not shown) within the aquarium water 20 are prevented from traveling through the outlet 44 to the filter 48. Regardless of whether a filtering sponge is provided by the outlet 44, preferably a lip 53 of the outlet 44 does not extend so far upward into the aquarium water flow control device 10 that the lip 53 diminishes the flow of aquarium water 20 through the outlet 44.

A tube 52 is positioned over the outlet 44, and the tube 52 extends in a substantially upward direction. An end 54 of the tube 52 is positioned over the outlet 44 and the other end 56 of the tube 52 extends out of the aquarium water 20 into the air 58. To provide that the tube 52 is secured in a substantially upward direction, the end 56 of the tube 52 can be adhered to the inside of the aquarium water flow control device 10. One skilled in the art would undoubtedly recognize other ways to provide that the tube 52 remains substantially upright. The tube 52 functions to supply air 58 to the outlet 44 when the outlet 44 is covered with aquarium water 20 and while aquarium water 20 is flowing through the outlet 44. In this manner, both aquarium water 20 and air 58 can simultaneously flow through the outlet 44, along the hose 46, and to the filter 48. Preferably, the tube 52 has an inside diameter 60 of between 0.25 inches and 0.75 inches, and is smaller than an inside diameter 62 of the outlet 44.

By providing that air 58 flows along with the aquarium water 20 through the outlet 44, the level of the aquarium water 20 in the second section 42 of the aquarium water flow control device 10 remains substantially constant above the outlet 44, and does not cycle back and forth between a maximum water level and a water level of effectively zero. Because the level of the aquarium water 20 above the outlet 44 does not significantly fluctuate back and forth, the sound of the aquarium water 20 flowing through the outlet 44 never becomes noisy, and the annoying, cyclical noise associated with prior art aquarium pre-filters is avoided.

As shown in the Figures, preferably the aquarium water flow control device 10 designed in accordance with the present invention is rectangular in configuration. As a result, the wall 16 of the aquarium 14 can be positioned very close to a wall of a room (not shown) in which the aquarium 14 sits. Therefore, not only does the aquarium 14 take up less space in the room, but small children are not able to crawl or walk between the aquarium 14 and the wall of the room. While it is preferable that an aquarium water flow control device 10 be rectangular in configuration, one skilled in the art would realize that the present invention is not limited to rectangular aquarium water flow control devices. In fact, the present invention can be utilized within an aquarium water flow control device which is square shaped.

The aquarium water flow control device 10 may also include a hiding wall 64 which effectively hides the tube 52 and the outlet 44 from view as one would look into the aquarium water flow control device 10. One advantage of the hiding wall 64 is that the aquarium water flow control device 10 then has a more aesthetic appearance.

Figure 3:
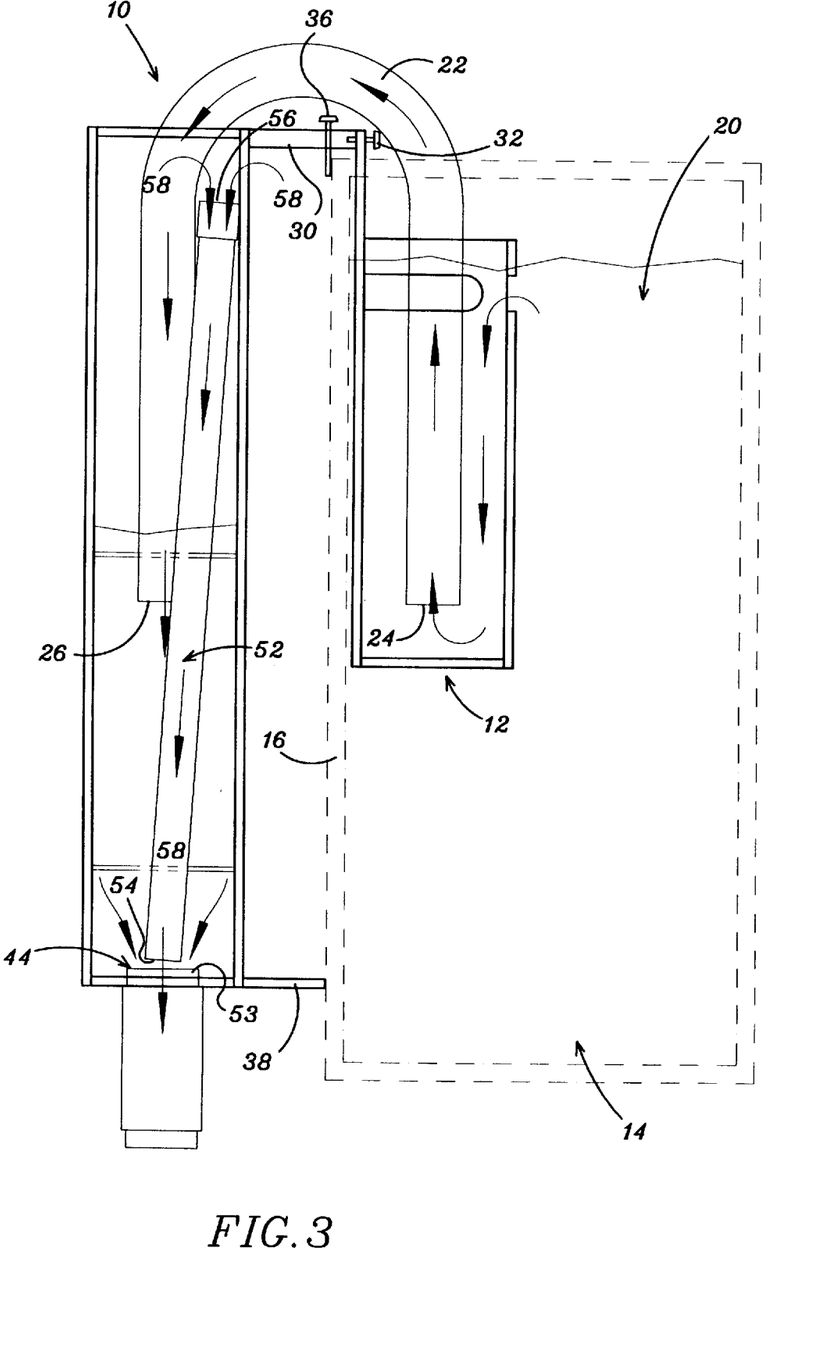
FIG. 3 is a side view of the aquarium water flow control device of FIGS. 1a, 1b, 2a and 2b showing the aquarium water flow control device hanging on an aquarium wall, showing aquarium water flowing from an aquarium into the aquarium water flow control device, and showing both aquarium water and air flowing from the aquarium water flow control device through the outlet.

The positioning and operation of the aquarium water flow control device 10 in accordance with the present invention will now be described. As shown in FIGS. 3 and 6, the aquarium water flow control device 10 hangs on the wall 16 of the aquarium 14 (as mentioned, the aquarium 14 is not shown to scale in the Figures), and the box 12 is inserted in the aquarium 14. The box 12 is connected to the top supporting panel 30 by way of the pins 32 being received in the slots 34 on the box 12. The screws 36 on the top supporting panel 30 are set so that the aquarium water flow control device 10 is at the desired height in relation to the wall 16 of the aquarium 14, and the bottom supporting panel 38 of the aquarium water flow control device 10 rests against the wall 16 of the aquarium 14.

In operation, aquarium water 20 from the aquarium 14 flows through the longitudinal slits 18, into the box 12, and thereafter travels through the siphon tubes 22 to the first section 28 of the aquarium water flow control device 10. After the aquarium water 20 flows into the first section 28, the aquarium water 20 can then flow over the wall 40, to the second section 42. If a filtering sponge (not shown) is positioned proximate to the wall 40, large particles (not shown) in the aquarium water 20 are prevented from traveling over the wall 40 with the aquarium water 20. After the aquarium water 20 has flowed over the wall 40 into the second section 42, the aquarium water 20 can flow through the outlet 44. When the aquarium water 20 flows through the outlet 44, the aquarium water flows into the hose 46 which leads to the filter 48. Preferably, the filter 48 removes contaminants from the aquarium water 20 and returns the aquarium water 20 to the aquarium 14 through the return hose 50. If a filtering sponge (not shown) is positioned by the outlet 44, large particles (not shown) within the aquarium water 20 are prevented from traveling through the outlet 44 along with the aquarium water 20. Preferably, because the lip 53 of the outlet 44 does not extend too far upward into the aquarium water flow control device 10, the lip 53 does not diminish the flow of aquarium water 20 through the outlet 44.

As shown in FIGS. 3, 4 and 6, when the aquarium water 20 flows through the outlet 44, air 58 from the end 54 of the tube 52 also flows through the outlet 44. Air 58 is able to flow through the tube 52 because the end 56 of the tube 52 extends out over the aquarium water 20 into the air 58. Therefore, the tube 52 supplies air 58 to the outlet 44 when the outlet 44 is covered with aquarium water 20 and while aquarium water 20 is flowing through the outlet 44. In this manner, both aquarium water 20 and air 58 simultaneously flow through the outlet 44, along the hose 46, and to the filter 48.

By providing that air 58 flows along with the aquarium water 20 through the outlet 44, the water level in the second section 42 of the aquarium water flow control device 10 remains substantially constant. As a result, an aquarium water flow control device 10 designed in accordance with the present invention eliminates the cyclical and annoying noise associated with prior art aquarium pre-filters.

The foregoing description and drawings merely explain and illustrate the invention, and the invention is not limited thereto, except insofar as the claims are so limited as those skilled in the art who have the disclosure before them will be able to make modifications and variations therein without departing from the scope of the invention. For example, something other than the box 12 and siphon tubes 22 may be utilized to provide that the aquarium water 20 is carried from the aquarium 14 to the aquarium water flow control device 10. Additionally, something other than the tube 52 as depicted and described herein may be utilized in order to supply air to the outlet 44 when the outlet 44 is covered with aquarium water 20 and while aquarium water 20 is flowing through the outlet 44 so that the water level above the outlet 44 remains substantially constant throughout the filtering process. For example, the end of a hose from a common air pump may be positioned over the outlet.

What is claimed is:

1. An aquarium water flow control device for receiving a flow of aquarium water from an aquarium and for controlling a flow of aquarium water thereafter from said aquarium water flow control device, said aquarium water flow control device comprising:
   a) an outlet capable of allowing said aquarium water to flow therethrough;
   b) a gas-carrying member positioned in close enough proximity to said outlet such that said gas-carrying member can supply gas to said outlet while said aquarium water is flowing through said outlet;
   c) a wall dividing said aquarium water flow control device into a first section and a second section, wherein said flow of aquarium water from said aquarium is flowable into said first section, wherein said aquarium water is flowable from said first section, over said wall, and to said second section, and wherein said outlet is located in said second section;
   d) a box insertable inside said aquarium having a wall, said aquarium water flowable from said aquarium into said box; and
   e) siphon structure capable of carrying said aquarium water from said box over said wall of said aquarium to said first section of said aquarium water flow control device.

2. The aquarium water flow control device according to claim 1, wherein said box is rectangular in configuration.

3. The aquarium water flow control device according to claim 1, said gas-carrying member positioned relative to said outlet such that said gas-carrying member supplies gas at a depth of said aquarium water over said outlet.

4. The aquarium water flow control device according to claim 1, said gas-carrying member comprising an air tube positioned over said outlet.

5. The aquarium water flow control device according to claim 4, wherein said outlet is connectable to a hose leading to an aquarium water filtering device capable of extracting said aquarium water and said gas through said outlet.

6. The aquarium water flow control device according to claim 4, wherein said tube has an inside diameter in the range of 0.25 inches to 0.75 inches.

7. The aquarium water flow control device according to claim 4, wherein a first end of said air tube is positioned relative to said outlet such that said air tube supplies air at a depth of said aquarium water over said outlet and a second end of said air tube extends over a surface of said aquarium water.

8. The aquarium water flow control device according to claim 1, further comprising a second box, said outlet located in said second box, said siphon structure positioned with respect to said first box, said second box and said wall of said aquarium such that said siphon structure carries aquarium water over said wall of said aquarium from said first box to said second box so that said aquarium water may thereafter flow to said outlet.

9. The aquarium water flow control device according to claim 8, said gas-carrying member positioned relative to said outlet such that said gas-carrying member supplies gas at a depth of said aquarium water over said outlet.

10. The aquarium water flow control device according to claim 8, said gas-carrying member comprising an air tube positioned over said outlet.

11. The aquarium water flow control device according to claim 10, wherein a first end of said air tube is positioned relative to said outlet such that said air tube supplies air at a depth of said aquarium water over said outlet and a second end of said air tube extends over a surface of said aquarium water.

12. A method of supplying gas to an outlet of an aquarium water flow control device receiving a flow of aquarium water from an aquarium to control a flow of said aquarium water therefrom, said method comprising:
   a) providing said aquarium water flow control device, said aquarium water flow control device including an outlet capable of allowing said aquarium water to flow therethrough, a gas-carrying member positionable in close enough proximity to said outlet such that said gas-carrying member can supply gas to said outlet while said aquarium water is flowing through said outlet, a wall dividing said aquarium water flow control device into a first section and a second section, wherein said flow of aquarium water from said aquarium is flowable into said first section, wherein said aquarium water is flowable from said first section, over said wall, and to said second section, and wherein said outlet is located in said second section, a box insertable inside said aquarium having a wall, said aquarium water flowable from said aquarium into said box; and siphon structure capable of carrying said aquarium water from said box over said wall of said aquarium to said first section of said aquarium water flow control device;
   b) inserting said box inside said aquarium such that said aquarium water is flowable from said aquarium into said box; and
   c) positioning said gas-carrying member within said aquarium water flow control device and close enough to said outlet of said aquarium water flow control device such that said gas-carrying member can supply gas to said outlet while said aquarium water is flowing through said outlet.

13. The method according to claim 12, wherein said step of positioning said gas-carrying member comprises positioning said gas-carrying member relative to said outlet such that said gas-carrying member supplies gas at a depth of said aquarium water over said outlet.

14. The method according to claim 12, wherein said aquarium water flow control device further includes a second box, said outlet located in said second box, said method further comprising positioning said siphon structure relative to said second box and said wall of said aquarium such that said siphon structure carries aquarium water over said wall of said aquarium to said second box so that said aquarium water may thereafter flow to said outlet alone with said gas.

15. An aquarium water flow control device for receiving a flow of aquarium water from an aquarium and for controlling a flow of aquarium water thereafter from said aquarium water flow control device, said aquarium water flow control device comprising:

a) a first box insertable inside said aquarium wherein said aquarium water in said aquarium flows from said aquarium into said first box;

b) a second box positionable outside said aquarium, said second box having an outlet;

c) siphon structure positioned with respect to said first box and said second box such that said siphon structure carries said aquarium water from said first box over a wall of said aquarium to said second box; and d) an air tube having a first end positioned relative to said outlet such that air carried by said air tube flows into said outlet with said aquarium water thereby providing that noise otherwise associated with flow of aquarium water through said outlet of said second box is reduced, said air tube having a second end extending over a surface of said aquarium water in said second box.

16. The aquarium water flow control device according to claim 15, said second box having a wall therein wherein said aquarium water from said siphon structure is flowable over said wall in said second box and is flowable thereafter to said outlet in said second box.

17. The aquarium water flow control device according to claim 15, wherein said first end of said air tube is positioned over said outlet of said second box.

18. The aquarium water flow control device according to claim 15, further comprising means associated with said first box for preventing fish from entering said first box.

19. The aquarium water flow control device according to claim 15, further comprising screws on the device for contacting a top of the wall of the aquarium, said screws being usable to change the height of the device in relation to the wall of the aquarium.

20. The aquarium water flow control device according to claim 15, further comprising structure on said second box for contacting the wall of the aquarium, and wherein said outlet of said second box is connected to a filter which cycles the aquarium water back to the aquarium.

* * * * *